(12) United States Patent
Corden et al.

(10) Patent No.: US 7,775,324 B2
(45) Date of Patent: Aug. 17, 2010

(54) TREADMILL LUBRICATION DEVICE

(76) Inventors: Thomas Peter Corden, 1020 Brookwood, Birmingham, MI (US) 48009; John Lane, 22612 Nottingham Dr., Beverly Hills, MI (US) 48025

( * ) Notice: Subject to any disclaimer, the term of this patent is extended or adjusted under 35 U.S.C. 154(b) by 309 days.

(21) Appl. No.: 11/690,647

(22) Filed: Mar. 23, 2007

(65) Prior Publication Data
US 2007/0227822 A1 Oct. 4, 2007

Related U.S. Application Data

(60) Provisional application No. 60/785,088, filed on Mar. 23, 2006.

(51) Int. Cl.
*F16N 7/12* (2006.01)
*A63B 22/02* (2006.01)
(52) U.S. Cl. .......................... 184/16; 184/10; 184/102; 482/54
(58) Field of Classification Search .............. 184/15.1, 184/64, 10, 16, 17, 21, 22, 23, 102, 3.1, 3.2; 118/264, 265, 267, 268, 269; 198/493–501
See application file for complete search history.

(56) References Cited

U.S. PATENT DOCUMENTS

| 126,351 | A | * | 4/1872 | Ustick | ............... | 184/64 |
|---|---|---|---|---|---|---|
| 1,700,275 | A | * | 1/1929 | Willett | ............... | 83/169 |
| 1,743,894 | A | * | 1/1930 | Johnson | ............... | 184/21 |
| 2,105,393 | A | * | 1/1938 | Avery | ............... | 118/268 |
| 2,459,006 | A | * | 1/1949 | Sova | ............... | 211/85.3 |
| 2,693,168 | A | * | 11/1954 | Hummel | ............... | 118/264 |
| 2,966,459 | A | | 12/1960 | Abel | | |
| 3,214,375 | A | | 10/1965 | Berkeley | | |
| 3,466,244 | A | | 9/1969 | Abel | | |
| 3,659,845 | A | | 5/1972 | Quinton | | |
| 3,703,284 | A | | 11/1972 | Hesen | | |
| 3,826,581 | A | | 7/1974 | Henderson | | |
| 4,022,295 | A | * | 5/1977 | Breuers | ............... | 184/15.1 |
| 4,216,845 | A | * | 8/1980 | Tashman et al. | ............... | 186/49 |
| 4,344,616 | A | | 8/1982 | Ogden | | |
| 4,757,347 | A | | 7/1988 | Tamaoki et al. | | |
| 4,972,796 | A | * | 11/1990 | Maina | ............... | 118/234 |
| 5,123,151 | A | | 6/1992 | Uehara et al. | | |
| 5,232,499 | A | | 8/1993 | Kato et al. | | |
| 5,360,084 | A | * | 11/1994 | Graf | ............... | 184/3.2 |
| 5,433,679 | A | | 7/1995 | Szymczak et al. | | |
| 5,643,144 | A | | 7/1997 | Trulaske | | |
| 5,913,384 | A | * | 6/1999 | Williams | ............... | 184/15.1 |
| 5,984,839 | A | * | 11/1999 | Corkum | ............... | 482/54 |

(Continued)

OTHER PUBLICATIONS

Permawick Website, Sep. 24, 2005; www.permawick.com.*

*Primary Examiner*—Bradley T King
*Assistant Examiner*—Thomas Irvin
(74) *Attorney, Agent, or Firm*—Clark Hill PLC

(57) ABSTRACT

A lubrication assembly is provided for lubricating a surface with a lubricant. The lubrication assembly includes a tube adapted to be coupled to the surface. The tube defines a reservoir for storing the lubricant thereon. The lubrication assembly also includes a wiper that is coupled to the tube. The wiper includes a first portion in fluid communication with the lubricant and a second portion disposed for continuous contact with the surface for automatically transferring and supplying the lubricant from the reservoir to the surface. The lubricant reduces frictional properties of the surface.

11 Claims, 8 Drawing Sheets

U.S. PATENT DOCUMENTS

| | | |
|---|---|---|
| 6,070,697 A | 6/2000 | Millard |
| 6,098,756 A * | 8/2000 | Shigetomi et al. ............. 184/22 |
| 6,247,555 B1 | 6/2001 | Millard |
| 6,378,161 B1 | 4/2002 | Parry |
| 6,449,455 B1 | 9/2002 | Lebold et al. |
| 6,869,385 B2 | 3/2005 | Kumura et al. |
| 6,875,164 B1 | 4/2005 | Lebold et al. |
| 2009/0071755 A1 * | 3/2009 | Hsiao ........................ 184/55.1 |

* cited by examiner

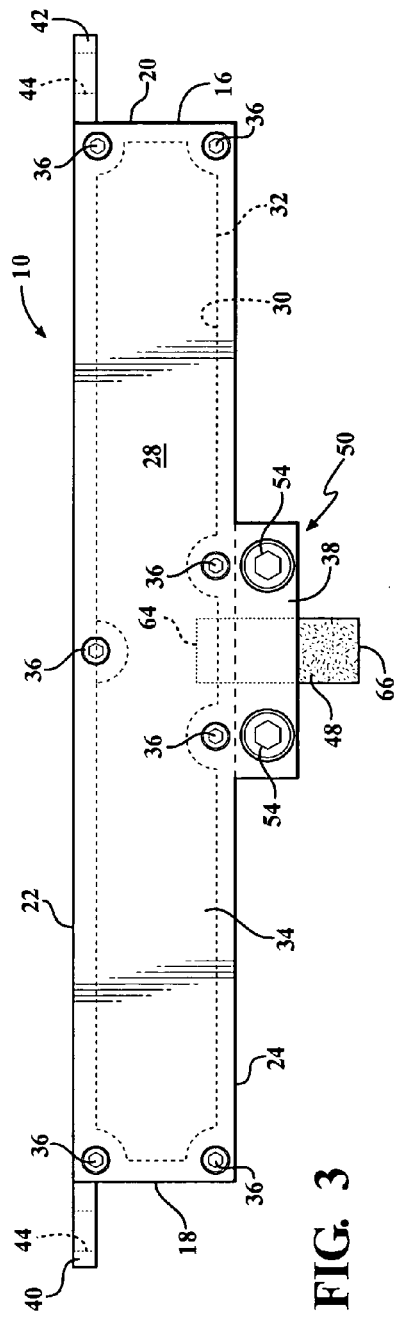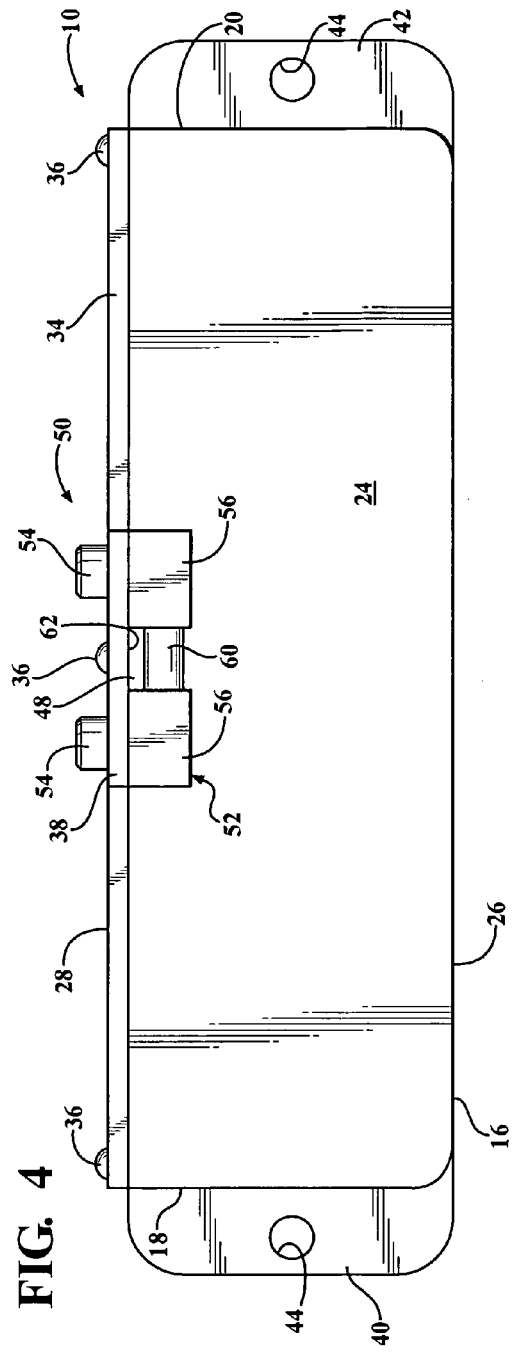
FIG. 3
FIG. 4

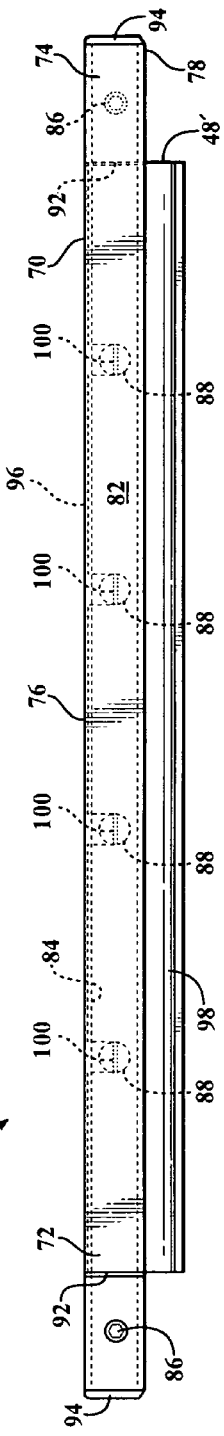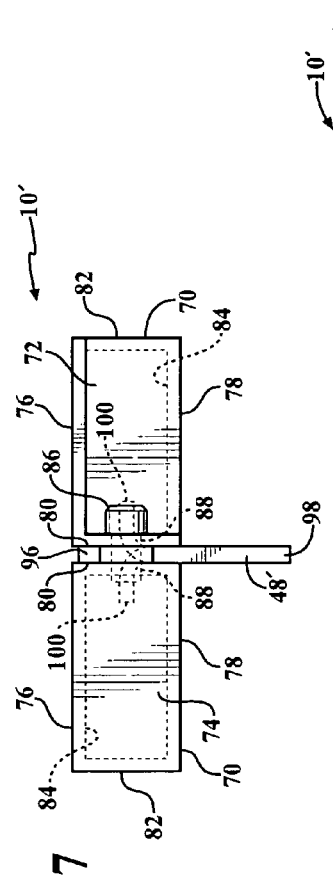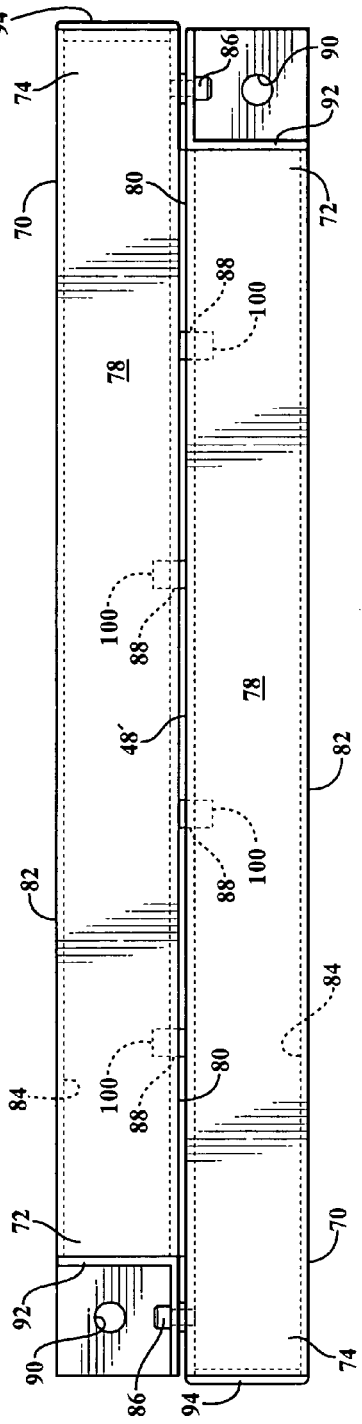

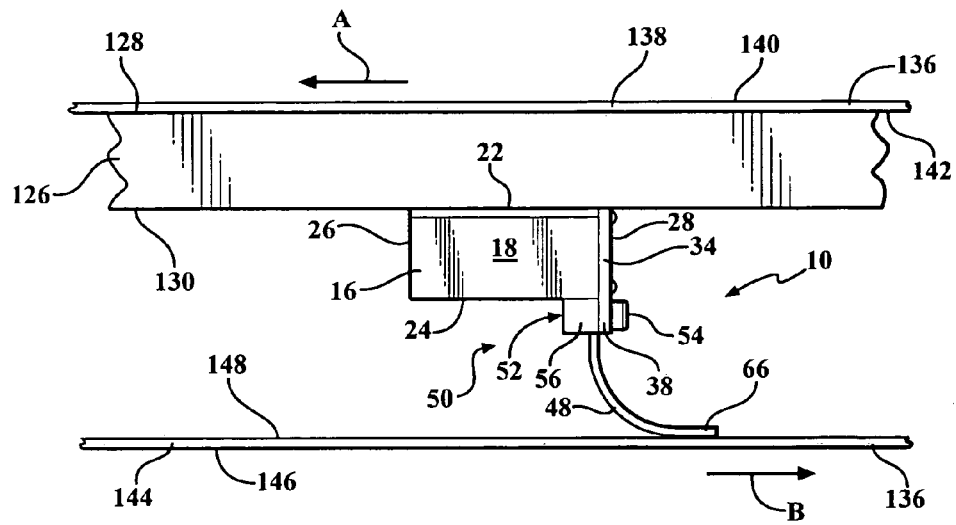
FIG. 13
FIG. 14
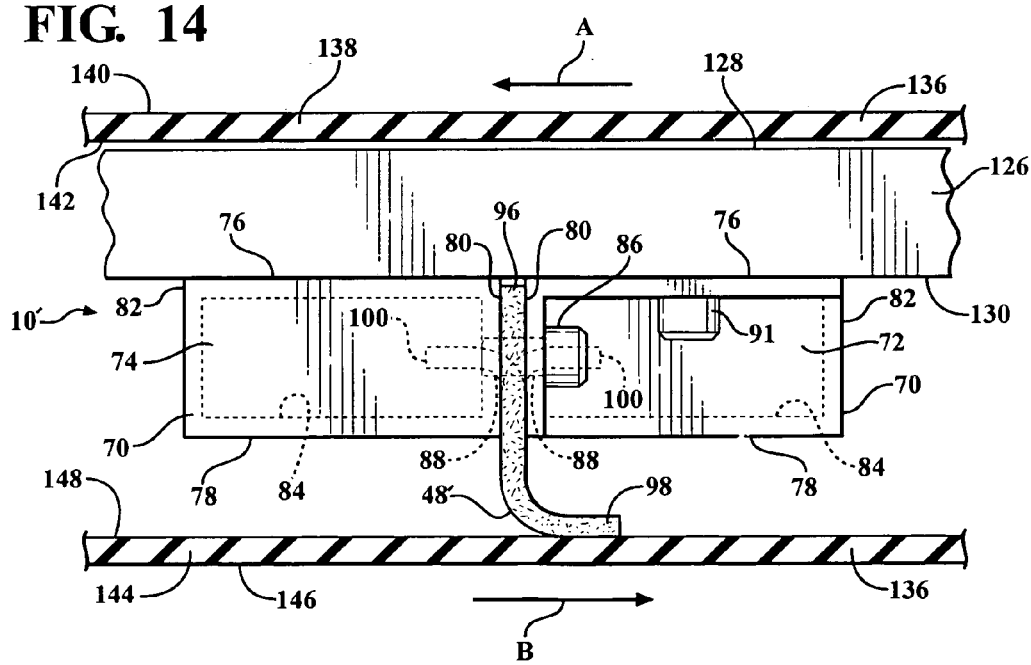

TREADMILL LUBRICATION DEVICE

CROSS-REFERENCE TO RELATED APPLICATION

This application claims priority to and all the benefits of U.S. Provisional Application Ser. No. 60/785,088, filed on Mar. 23, 2006 and entitled "Treadmill Lube Assembly."

BACKGROUND OF THE INVENTION

1. Field of the Invention

The invention relates to a lubrication assembly, and more particularly to a lubrication assembly having a wiper for applying a lubricant to a surface.

2. Description of Related Art

Lubrication assemblies are used in many different applications for applying lubricants to a surface that requires lubrication. Such applications include lubricating hot and cold rolled steel prior to coiling the steel, lubricating steel blanks prior to part processing such as by deep drawing, conditioning of bowling lanes, and lubricating bearings, chains and belts in conveyor systems, just to name a few.

Various methods have been used to lubricate the surface in relation to the above applications. For example, the lubricant can be rubbed onto the surface, the lubricant can be embedded into the surface, a non-stick coating can be applied to the surface, the lubricant can be applied by a roller, and the lubricant can be sprayed onto the surface using an automated spraying system. As well, a host of other methods may be employed with mediocre results.

There are, however, problems associated with all of the previously described methods. In relation to lubricating a conveyor belt, the effect of rubbing, embedding, or applying the lubricant to the belt or surface at a point in time diminishes as the conveyor is used. Eventually the conveyor must be serviced in some way so as to restore an acceptable coefficient of friction. Additionally, rubbing, embedding, or applying the lubricant to the belt may result in flakes being produced as the lubricant is rubbed off during use. On the other hand, automatic lubrication systems require sophisticated pumps to apply a liquid lubricant and a monitoring circuit is employed to monitor the application of the liquid lubricant. Such assemblies add expense and are prone to nozzle blockage and failure. In addition, reservoirs filled with liquid lubricant may spill or leak.

Consequently, it is desirable to provide a simple and inexpensive lubrication assembly for applying a consistent amount of lubricant to a surface over time. It is also desirable that the lubrication assembly be leak proof to prevent any unwanted lubricant from escaping. It is further desirable that the lubrication assembly not produce flakes of lubricant. Finally, it is desirable that the lubrication assembly and/or the lubricant be easily replaceable.

SUMMARY OF THE INVENTION

According to one aspect of the invention, a lubrication assembly is provided for lubricating a surface with a lubricant. The lubrication assembly includes a tube adapted to be coupled to the surface. The tube defines a reservoir for storing the lubricant therein. The lubrication assembly also includes a wiper that is coupled to the tube. The wiper includes a first portion in fluid communication with the lubricant and a second portion disposed for continuous contact with the surface for automatically transferring and supplying the lubricant from the reservoir to the surface. The lubricant reduces frictional properties of the surface.

According to another aspect of the invention, a lubrication assembly is provided for a treadmill. The treadmill includes a support deck and an endless belt that extends in a closed loop around the support deck. The endless belt includes an interior surface that engages the support deck resulting in friction therebetween. The lubrication assembly includes at least one tube adapted to be coupled to the support deck. The at least one tube defines a reservoir therein. A lubricant is disposed within the reservoir. A wiper is coupled to the at least one tube. The wiper includes a first portion in fluid communication with the lubricants and a second portion disposed for continuous contact with the interior surface of the endless belt. The wiper automatically transfers and supplies the lubricant from the reservoir to the endless belt as the endless belt moves relative to the wiper. The lubricant reduces the friction between the support deck and the interior surface of the endless belt.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a front view of the lubrication assembly of FIG. 1;

FIG. 4 is bottom view of the lubrication assembly of FIG. 1;

FIG. 6 is front view of a lubrication assembly according to a second embodiment of the invention;

FIG. 7 is a side view of the lubrication assembly of FIG. 6;

FIG. 8 is a bottom view of the lubrication assembly of FIG. 6;

FIG. 13 is a fragmentary, side view of the treadmill including the lubrication assembly of FIG. 1;

FIG. 14 is a fragmentary, side view of the treadmill including the lubrication assembly of FIG. 6;

DETAILED DESCRIPTION OF THE PREFERRED EMBODIMENT

Figure 1:
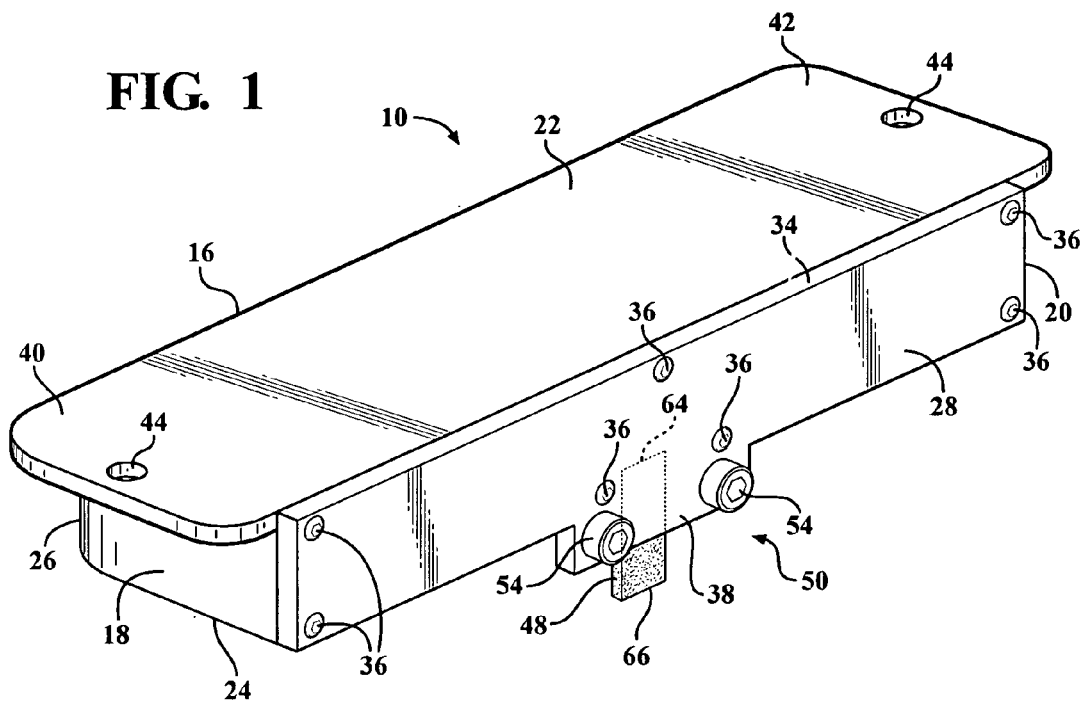
FIG. 1 is a perspective view of a lubrication assembly according to the invention.
Figure 2:
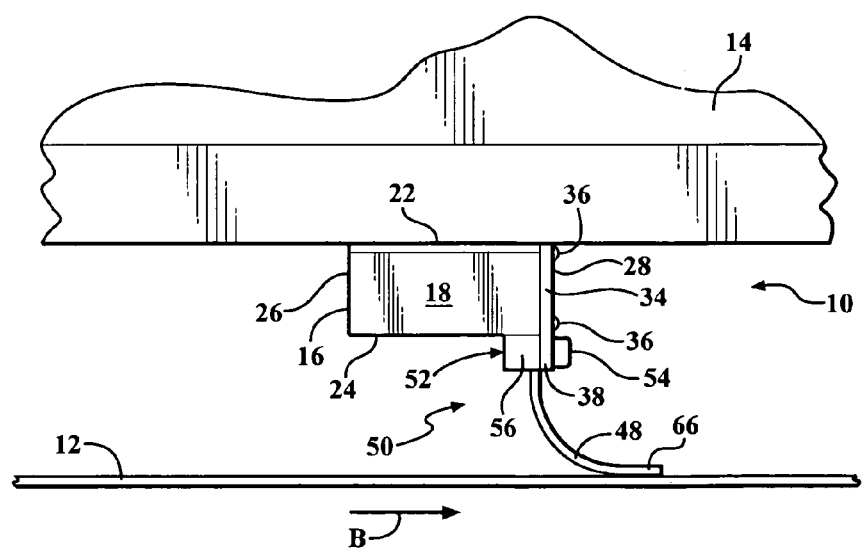
FIG. 2 is a side view of the lubrication assembly of FIG. 1 lubricating a movable member.

Referring to FIGS. 1 through 5, a lubrication assembly is generally shown at 10. In the embodiment shown, the lubrication assembly 10 is provided for lubricating a movable member or surface 12 and is adapted for mounting to a stationary member or surface 14, as is described in more detail below. The lubrication assembly 10 includes an elongated rectangular tube 16 extending between a first end 18 and a second end 20. The tube 16 includes a top side 22, a bottom side 24, a back side 26, and a front side 28 defining a reservoir 30 within the tube 16. The front side 28 includes an opening 32 therein. A removable front cover 34 is adapted to be fixedly secured to the front side 28 of the tube 16 for covering the opening 32. The front cover 34 is fixedly secured to the tube 16 using a plurality of screws 36 or other similar fasteners. The front cover 34 includes an integral clamping portion 38, the purpose of which is described below. It is appreciated that the tube 16 is not limited to the rectangular shape shown in the Figures, but could also be a cylindrical tube or other various shapes. The top side 22 includes first and second portions 40, 42 that extend beyond the respective first and second ends 18, 20 of the tube 16. The first and second portions 40, 42 each include an aperture or opening 44 for receiving a bolt or other similar fastener (not shown) therethrough for mounting the lubrication assembly 10 to the stationary member 14.

Figure 5:
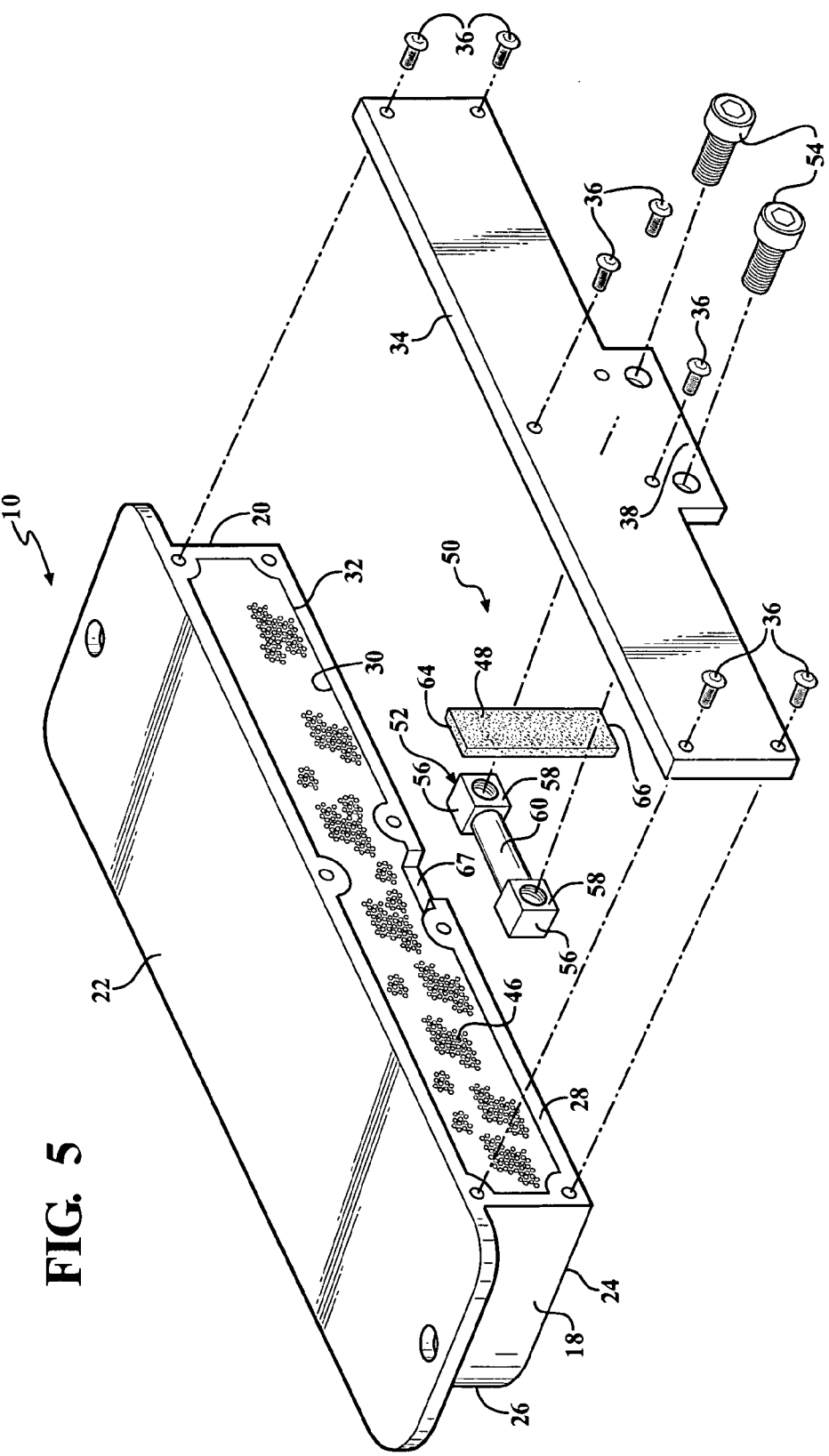
FIG. 5 is an exploded view of the lubrication assembly of FIG. 1.

Referring to FIG. 5, the reservoir 30 is filled with a lubricant storing and releasing material 46, such as an oil impregnated, fibrous wicking material as is disclosed in commonly owned U.S. Pat. Nos. 3,466,244; 3,214,375; and 2,966,459, which are hereby incorporated by reference. Two examples of the material 46 that can be used in the reservoir 30 are sold under the trademarks PERMAWICK® and PERMAGEL®, which are produced by Permawick Company of Bingham Farms, Mich. The material 46 sold under the trademark PERMAWICK® is the oil impregnated, fibrous wicking material described above. The material 46 sold under the trademark PERMAGEL® is a blend of formulated oil and thickening additives. The material 46 provides a predetermined oil release factor which controls or regulates the rate at which lubricant is released. Unlike an entirely liquid lubricant, the material 46 is easily contained within the reservoir 30 such that an additional benefit of using the material 46 is the prevention of unwanted lubricant escaping from the reservoir 30. Additionally, because the front cover 34 is removable, the reservoir 30 may be easily accessed to replace the material 46 after a specified period of time. While the lubricant used in the embodiment shown is released by the material 46 disposed in the reservoir 30, it will be appreciated that any of a plurality of lubricants may be used without varying from the scope of the invention.

Referring to FIGS. 1 through 5, the lubrication assembly 10 also includes a wiper or applicator 48 for automatically transferring and supplying lubricant from the reservoir 30 to the movable member 12. A flow restrictor, generally shown at 50, is provided for securing the wiper 48 to the lubrication assembly 10 and regulating the flow of lubricant through the wiper 48. More specifically, the flow restrictor 50 includes a base, generally indicated at 52, which is fixedly secured to the lubrication assembly 10 by a pair of bolts or screws 54 extending through the clamping portion 38 of the front cover 34 and the base 52. The base 52 includes a pair of spaced apart blocks 56 each having an end surface 58 and a cylindrical connecting member 60 extending therebetween. The end surface 58 of the blocks 56 abuts the clamping portion 38 of the front cover 34 thereby defining a gap 62 between the connecting member 60 and the front cover 34 when the base 52 is fixedly secured thereto, as shown in FIG. 4. The wiper 48 extends through the gap 62. In the embodiment shown, the flow restrictor 50 and the wiper 48 are positioned generally in the middle of the tube 16, between the first and second ends 18, 20.

The wiper 48 is generally rectangular and extends between a first upper portion 64 and a second lower portion 66. The wiper 48 extends through a slot 67 in the bottom side 24 of the tube 16 and is sized such that there is a snug fit between the wiper 48 and the tube 16 to prevent any leakage of the material 46 or lubricant from the reservoir 30. The upper portion 64 of the wiper 48 is disposed in the reservoir 30 and is in direct contact with the material 46 disposed therein. The lower portion 66 of the wiper 48 extends downwardly below the bottom side 24 of the tube 16 and is in continuous contact with the movable member 12. The wiper 48 is resiliently flexible in order to maintain an even amount of pressure and contact on the movable member 12. In the embodiment shown, the wiper 48 is a felt material; however, it is appreciated that the wiper 48 may be any suitable material without varying from the scope of the invention.

The flow restrictor 50 regulates the flow of lubricant through the wiper 48 by adjusting the thickness of the gap 62. It is appreciated that decreasing the thickness of the gap 62 will compress the wiper 48 and restrict the flow of lubricant through the wiper 48, thus transferring and supplying less lubricant to the movable member 12. The thickness of the gap 62 is adjusted by machining the end surface 58 of the blocks 56 such that when the base 52 is fixedly secured to the clamping portion 38 of the front cover 34 the thickness of the gap 62 is decreased. The thickness of the gap 62 can be adjusted depending on the requirements of the specific application to obtain the desired amount of lubricant transferred from the reservoir 30 to the movable member 12.

The flow of lubricant from the reservoir 30 to the movable member 12 can be regulated by changing any of the following elements separately or in combination: (i) the type of the material 46 disposed in the reservoir 30; (ii) the type of lubricant in the material 46; (iii) the material of the wiper 48; (iv) the size of the wiper 48—including length, thickness, and width; and (v) the thickness of the gap 62.

Although not shown, it is appreciated that the lubrication assembly 10 could, in the alternative, be mounted to the movable member 12 such that the wiper 48 is in contact with the stationary member 14. The movable member 12 would then move the lubrication assembly 10 relative to the stationary member 14 and the wiper 48 would transfer lubricant from the reservoir 30 to the stationary member 14.

Figure 9:
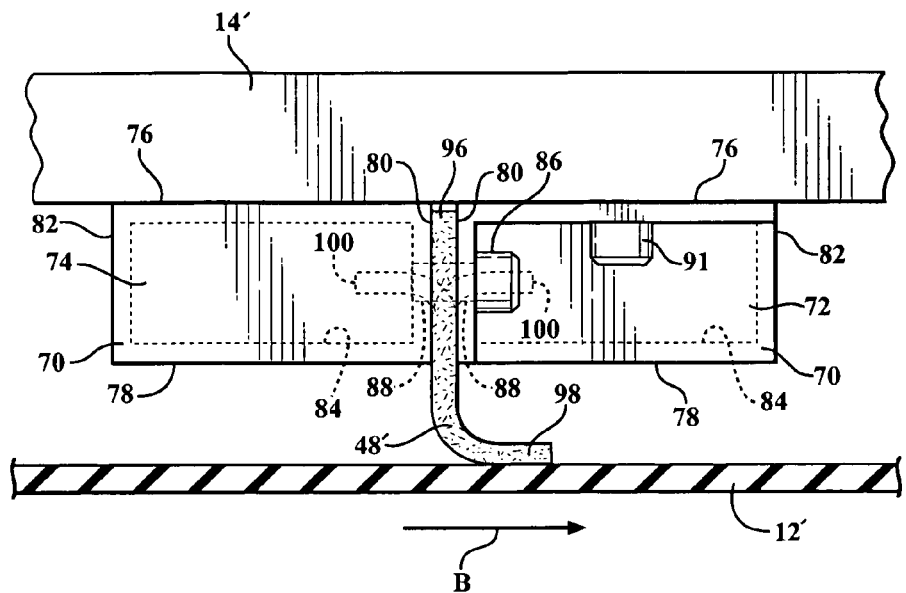
FIG. 9 is a side view of the lubrication assembly of FIG. 6 lubricating a movable member.
Figure 10:
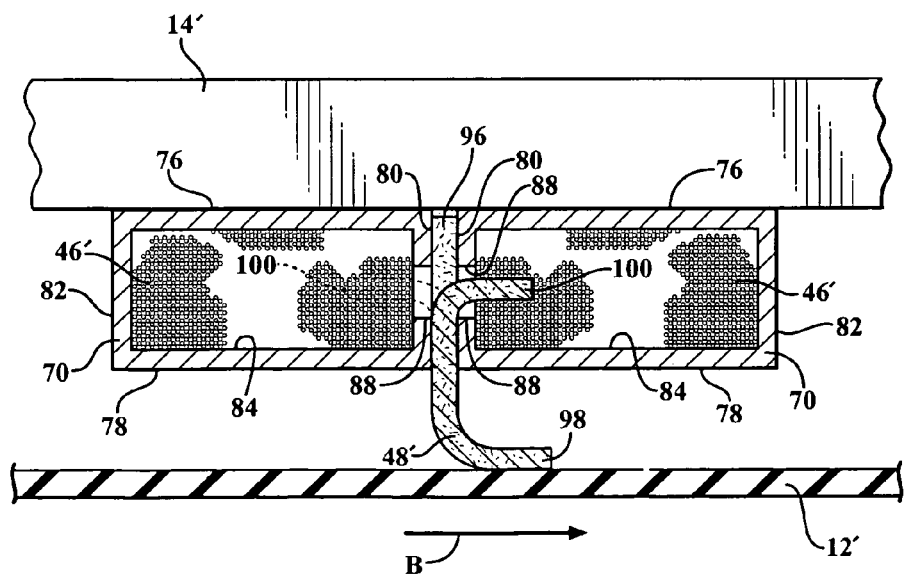
FIG. 10 is a cross-sectional side view of the lubrication assembly of FIG. 6 lubricating the movable member.

Referring to FIGS. 6 through 10, wherein like primed reference numerals represent similar elements as those described above, in a second embodiment of the invention the lubrication assembly 10' includes a pair of elongated rectangular tubes 70 fixedly secured together with a wiper 48' disposed therebetween. Each tube 70 extends between a first end 72 and a second end 74. Each tube 70 also includes a top side 76, a bottom side 78, an inner side 80, and an outer side 82 defining a reservoir 84 within the respective tube 70. The inner sides 80 of the tubes 70 are in facing relation and the tubes 70 are fixedly secured together by a pair of bolts 86 or other similar fasteners. The tubes 70 are positioned with the first end 72 of one tube 70 adjacent to the second end 74 of the other tube 70 such that a portion of the reservoirs 84 are adjacent and laterally overlap. Along the overlapping portion of the reservoirs 84, the inner sides 80 of each tube 70 include a plurality of laterally spaced apart holes 88. The plurality of laterally spaced apart holes 88 in one tube 70 are offset from and do not coincide with the plurality of laterally spaced apart holes 88 in the other tube 70 when the tubes 70 are fixedly secured together. In the embodiment shown, the inner side 80 of each tube 70 includes two (2) holes 88. The bottom and outer sides 78, 82 of each tube 70 are recessed at the first end 72 to allow access to the bolts 86 fixedly securing the tubes 70 together. The top side 76 of each tube 70, at the first end 72 thereof, includes an aperture 90 for receiving a bolt or other similar fastener 91 (one shown) therethrough for mounting the lubrication assembly 10' to the stationary member 14', as shown in FIG. 9.

Each tube 70 includes first and second end caps 92, 94 for closing the respective first and second ends 72, 74 of the tube 70. In the embodiment shown, the first end cap 92 is welded and therefore fixedly secured to the first end 72 of each tube 70. The second end cap 94 is press fit and therefore removably coupled to the second end 74 of each tube 70. The reservoir 84 in each tube 70 is filled with the lubricant storing and releasing material 46'. Because the second end cap 94 is removably coupled to the second end 74 of each tube 70, the reservoirs 84 may be easily accessed to replace the material 46' after a specified period of time.

The wiper 48' is designed for automatically transferring and supplying lubricant from the reservoirs 84 to the movable member 12'. The wiper 48' is generally rectangular and extends the width of the overlapping portion of the reservoirs 84. The wiper 48' extends between a first upper portion 96 and a second lower portion 98. The upper portion 96 is disposed between the inner sides 80 of the tubes 70. The lower portion 98 extends downwardly below the bottom side 78 of the tubes 70 and is in continuous contact with the movable member 12'. The wiper 48' is resiliently flexible in order to maintain an even amount of pressure and contact on the movable member 12'. In the embodiment shown, the wiper 48' is a felt material; however, it is appreciated that the wiper 48' may be any suitable material without varying from the scope of the invention.

The upper portion 96 of the wiper 48' includes a plurality of laterally spaced apart fingers 100. The plurality of laterally spaced apart fingers 100 correspond to the plurality of laterally spaced apart holes 88 in the inner sides 80 of the tubes 70. In the embodiment shown, the upper portion 96 of the wiper 48' includes four (4) fingers 100. Each finger 100 extends through the corresponding hole 88 and into the respective reservoir 84. The fingers 100 alternate reservoirs 84 such that first and third fingers 100 extend through holes 88 in one tube 70 and second and fourth fingers 100 extend through holes 88 in the other tube 70.

The flow of lubricant from the reservoirs 84 to the movable member 12' can be regulated by changing any of the following elements separately or in combination: (i) the type of the material 46' disposed in the reservoirs 84; (ii) the type of lubricant in the material 46'; (iii) the material of the wiper 48'; (iv) the size of the wiper 48'—including length, thickness, and width; and (v) the size of the fingers 100.

Although, not shown, it is appreciated that the lubrication assembly 10' could, in the alternative, be mounted to the movable member 12' such that the wiper 48' is in contact with the stationary member 14'. The movable member 12' would then move the lubrication assembly 10' relative to the stationary member 14' and the wiper 48' would transfer lubricant from the reservoirs 84 to the stationary member 14'.

It is contemplated that the lubrication assembly 10, 10' could be used for a variety of different applications requiring lubrication such as for example lubricating hot and cold rolled steel prior to coiling the steel, lubricating steel blanks prior to part processing such as by deep drawing, conditioning of bowling lanes, and lubricating bearings, chains and belts in conveyor systems. One example in which the lubrication assembly 10, 10' is used with a type of conveyor system is in an exercise treadmill, generally shown, at 110, in FIGS. 11 and 12. Exercise treadmills 110 are well known for allowing a user to walk or run in a stationary position.

Figure 11:
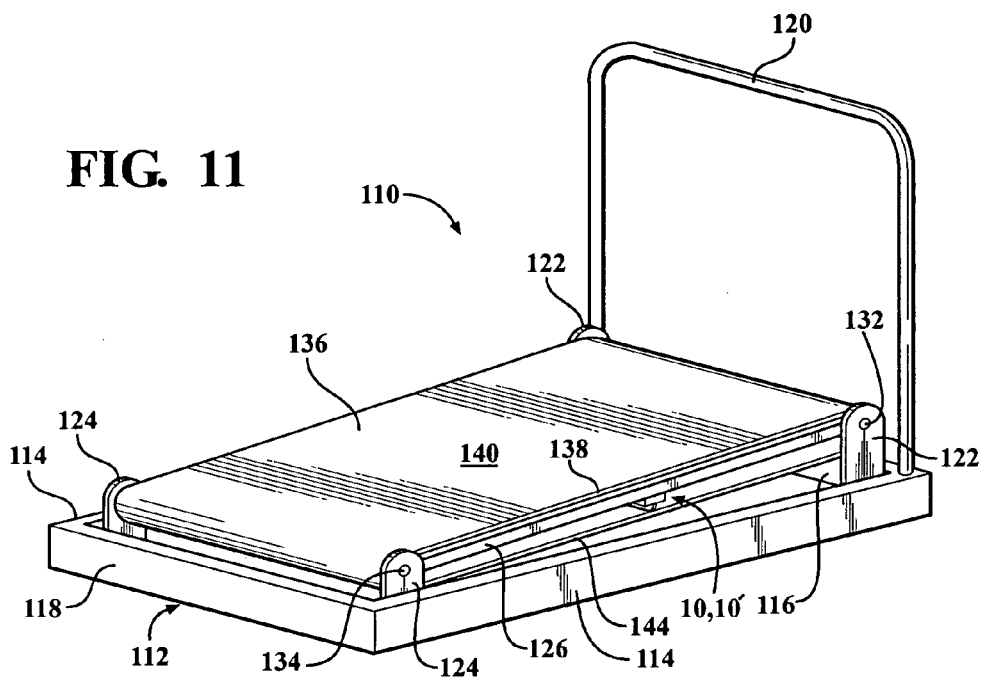
FIG. 11 is a perspective view of a treadmill including the lubrication assembly of FIG. 1 or FIG. 6.
Figure 12:
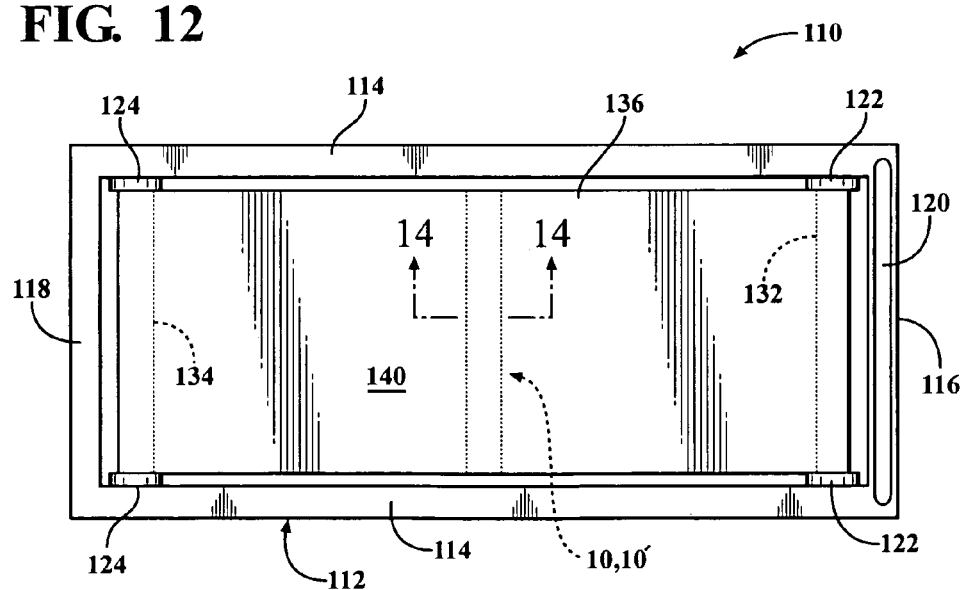
FIG. 12 is a top view of the treadmill of FIG. 11.
Figure 15:
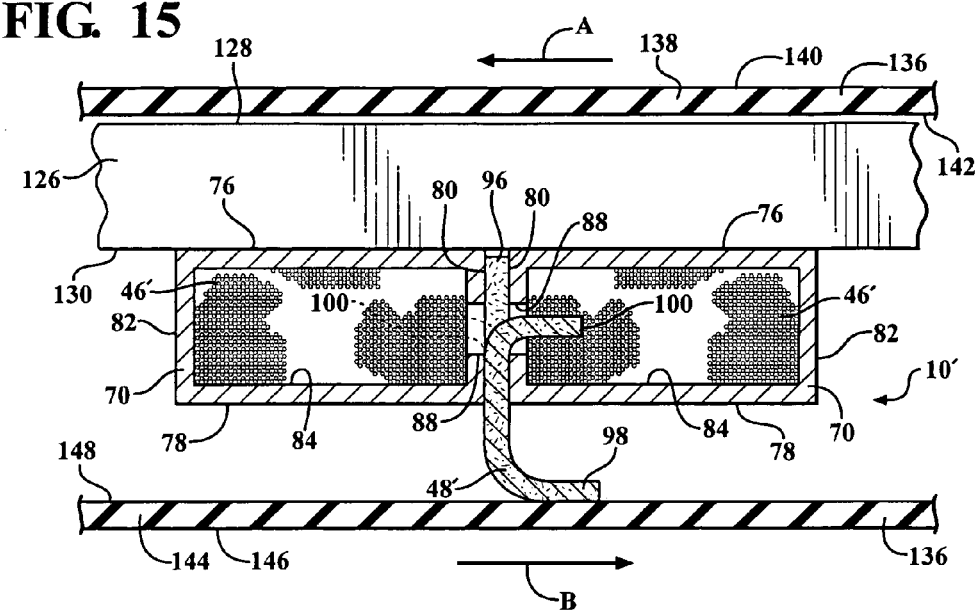
FIG. 15 is a cross-sectional view taken along lines 15-15 of FIG. 12 illustrating the lubrication assembly of FIG. 6.

The treadmill 110 includes a generally rectangular support frame, generally indicated at 112, having a pair of laterally spaced apart and elongated side members 114 extending between a forward member 116 and a rearward member 118. A user support handle 120 extends upwardly from and is fixedly secured to the forward member 116. The treadmill 110 also includes a pair of opposing and laterally spaced apart forward roller brackets 122 and rearward roller brackets 124. The forward roller brackets 122 are fixedly secured to the side members 114 adjacent to the forward member 116. The rearward brackets 124 are fixedly secured to the side members 114 adjacent to the rearward member 118. A support deck 126, equivalent to the stationary member 14, 14' described above, extends between the forward and rearward roller brackets 122, 124 and includes an upper deck surface 128 and a lower deck surface 30, shown in FIGS. 13 through 15. The support deck 14, 14', 126 can be positioned on an incline, as shown in FIG. 11, positioned horizontally, or adjusted between a horizontal position and an inclined position. The support deck 14, 14', 126 is typically a smooth sheet of wood, metal or the like. A first or powered roller 132 extends laterally between and is rotatably coupled at its ends to the forward roller brackets 122. A second or idler roller 134, parallel to the first roller 132, extends laterally between and is rotatably coupled at its ends to the rearward roller brackets 124. It should be noted that the first roller 132 can also be an idler roller where the treadmill 110 is manually powered by the user's walking or running movement without departing from the scope of the invention. An endless belt 136, equivalent to the movable member 12, 12' described above, extends in a closed loop around the first and second rollers 132, 134. Referring to FIGS. 13 through 15, the belt 12, 12', 136 includes an upper section 138 having an exterior surface 140 and an interior surface 142. The user's feet engage the exterior surface 140 along the upper section 138 of the belt 12, 12', 136. The interior surface 142 of the upper section 138 engages the first and second rollers 132, 134 and the upper deck surface 128. The belt 12, 12', 136 also includes a lower section 144 having an exterior surface 146 and an interior surface 148. The interior surface 148 of the lower section 144 engages the first and second rollers 132, 134.

It will be appreciated by one skilled in the art that the design of the treadmill 110 may vary from that described above without departing from the scope of the invention. For the purpose of this example, it is only necessary that the treadmill 110 include the belt 12, 12', 136 extending in a closed loop around the first and second rollers 132, 134 with the support deck 14, 14', 126 positioned between the upper and lower sections 138, 144 of the belt 12, 12', 136.

The treadmill 110 further includes the lubrication assembly 10, 10' for lubricating the belt 12, 12', 136. The lubrication assembly 10, 10', is mounted to the lower deck surface 130 at a location between the forward and rearward rollers 132, 134. The lubrication assembly 10, 10' is generally parallel to the forward and rearward rollers 132, 134 and may extend substantially the entire width of the belt 12, 12', 136.

In operation, the belt 12, 12', 136 moves in an endless path about the first and second rollers 132, 134 while moving along the upper deck surface 128 in the direction of arrow A. The user's feet engage the exterior surface 140 of the upper section 138 of the belt 12, 12', 136 thereby exerting a downward force on the support deck 14, 14', 126. The downward force causes friction between the interior surface 142 of the upper section 138 of the belt 12, 12', 136 and the upper deck surface 128. At the same time, lubricant stored in the material 46, 46' is released and transferred by the wiper 48, 48' to the interior surface 148 of the lower section 144 of the belt 12, 12', 136 due to the movement of the belt 12, 12', 136 past the wiper 48, 48' in the direction of arrow B. The interior surface 148 of the lower section 144 then becomes the interior surface 142 of the upper section 138 and the lubricant reduces the coefficient of friction between the upper deck surface 128 and the belt 12, 12', 136.

Figure 16:
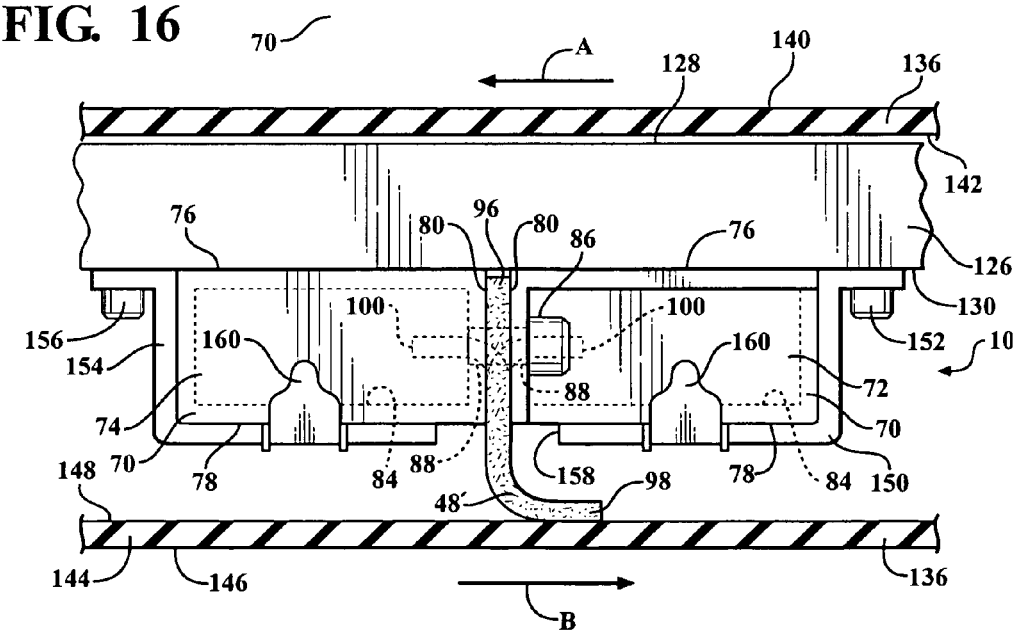
FIG. 16 is a fragmentary, side view of the treadmill including a quick release system supporting the lubrication assembly of FIG. 6.

FIG. 16 illustrates an example in which the lubrication assembly 10' is used with the treadmill 110 and is removably coupled to the lower deck surface 130 to allow for replacement of the lubrication assembly 10' without the use of tools. A first support bracket 150 is fixedly secured to the lower deck surface 130 by bolts or other similar fasteners 152 (one shown). The first support bracket 150 extends laterally substantially the entire width of the belt 12', 136'. Similarly, a second support bracket 154 is fixedly secured to the lower deck surface 130 by bolts or other similar fasteners 156 (one shown). The second support bracket 154 extends laterally, substantially the entire width of the belt 12', 136'. The first and second support brackets 150, 154 are spaced apart providing a gap 158 therebetween. The lubrication assembly 10' is supported by the first and second support brackets 150, 154, and the wiper 48' extends downwardly through the gap 158 and is in continuous contact with the belt 12', 136' as described above.

Each of the first and second support brackets 150, 154 include a first tab (not shown) fixed at one end thereof. The fixed tabs locate the lubrication assembly 10' laterally with respect to the belt 12', 136' and prevent the lubrication assembly 10' from sliding out of the first and second support brackets 150, 154 during operation of the treadmill 110. At ends opposite the fixed tabs, the first and second support brackets 150, 154 each include a second tab 160 quick release coupled thereto. The quick release tabs 160 locate the lubrication assembly 10' laterally with respect to the belt 12', 136' and prevent the lubrication assembly 10' from sliding out of the first and second support brackets 150, 154 during operation of the treadmill 110. The quick release tabs 160 can be released by hand to allow removal and replacement of the lubrication assembly 10'. While the treadmill 110 is shown with the lubrication assembly 10' removably coupled thereto, it is contemplated that the lubrication assembly 10 could similarly be removably coupled to the treadmill 110 without varying from the scope of the invention.

The invention has been described in an illustrative manner, and it is to be understood that the terminology, which has been used, is intended to be in the nature of words of description rather than of limitation. Many modification and variations of the present invention are possible in light of the above teachings. It is, therefore, to be understood that within the scope of the appended claims, the invention may be practiced other than as specifically described.

What is claimed:

1. A lubrication assembly mounted to a first surface is provided for lubricating a second surface, said lubrication assembly comprising:

a first tube adapted to be coupled to the first surface, said first tube defining a first reservoir, and said first tube including a first side having a plurality of laterally spaced apart holes extending into said first reservoir;

a second tube adapted to be coupled to the first surface, said second tube defining a second reservoir, said second tube including a first side having a plurality of laterally spaced apart holes extending into said second reservoir, wherein said first and second tubes are fixedly secured together with said first sides of said first and second tubes abutting such that said first reservoir laterally overlaps at least a portion of said second reservoir and said plurality of laterally spaced apart holes in said first tube are offset laterally from said plurality of laterally spaced apart holes in said second tube;

a material disposed within said first reservoir and said second reservoir, said material including a lubricant; and a wiper coupled between said first tube and said second tube, said wiper having a first portion in fluid communication with said material and a second portion disposed for continuous contact with the second surface for automatically transferring and supplying said lubricant from said first reservoir and said second reservoir to the second surface, whereby said lubricant reduces frictional properties of the second surface, wherein said first portion includes a plurality of laterally spaced apart fingers alternating between extending through said plurality of laterally spaced apart holes in said first tube into said first reservoir and said plurality of laterally spaced apart holes in said second tube into said second reservoir.

2. A lubrication assembly as set forth in claim 1 wherein said first tube includes an end cap removably coupled thereto for providing access to said first reservoir therein and said second tube includes an end cap removably coupled thereto for providing access to said second reservoir therein.

3. A lubrication assembly as set forth in claim 2 wherein a width of said wiper is generally the same width as the overlapping portion of said first reservoir of said first tube and said second reservoir of said second tube.

4. A lubrication assembly as set forth in claim 1 wherein said material is an oil impregnated, fibrous wicking material.

5. A lubrication assembly as set forth in claim 1 wherein said material is a blend of formulated oil and thickening additives.

6. A lubrication assembly is provided for a treadmill including a support deck and an endless belt extending in a closed loop around the support deck, the endless belt having an interior surface engaging the support deck resulting in friction therebetween, said lubrication assembly comprising:

a first tube adapted to be coupled to the support deck of the treadmill, said first tube defining a first reservoir therein, and said first tube including a first side having a plurality of laterally spaced apart holes extending into said first reservoir;

a second tube adapted to be coupled to the first surface, said second tube defining a second reservoir, and said second tube including a first side having a plurality of laterally spaced apart holes extending into said second reservoir, wherein said second tube is fixedly secured to said first tube with said first sides of said first and second tubes abutting such that said first reservoir laterally overlaps at least a portion of said second reservoir and said plurality of laterally spaced apart holes in said first tube are offset laterally from said plurality of laterally spaced apart holes in said second tube;

a material disposed within said first and second reservoirs, said material including a lubricant; and a wiper coupled between said first tube and said second tube, said wiper having a first portion in fluid communication with said material and a second portion disposed for continuous contact with the interior surface of the endless belt for automatically transferring and supplying said lubricant from said first and second reservoirs to the endless belt as the endless belt moves relative to said wiper thereby reducing the friction between the support deck and the interior surface of the endless belt, wherein said first portion includes a plurality of laterally spaced apart fingers, said plurality of laterally spaced apart fingers alternating between extending through said plurality of spaced apart holes in said first tube into said first reservoir and said plurality of laterally spaced apart holes in said second tube into said second reservoir.

7. A lubrication assembly as set forth in claim 6 wherein said first tube includes an end cap removably coupled thereto for providing access to said first reservoir therein and said second tube includes an end cap removably coupled thereto for providing access to said second reservoir therein.

8. A lubrication assembly as set forth in claim 7 wherein a width of said wiper is generally the same width as the overlapping portion of said first reservoir of said first tube and said second reservoir of said second tube and the same width as the endless belt.

9. A lubrication assembly as set forth in claim 8 including a pair of spaced apart brackets fixedly secured to the support deck of the treadmill for securing and supporting said lubrication assembly, said pair of spaced apart brackets including at least one quick release tab preventing removal of said lubrication assembly during use of the treadmill and allowing selective removal of said lubrication assembly.

10. A lubrication assembly as set forth in claim 6 wherein said material is an oil impregnated, fibrous wicking material.

11. A lubrication assembly as set forth in claim 6 wherein said material is a blend of formulated oil and thickening additives.

* * * * *